United States Patent [19]
Gassiott

[11] Patent Number: 5,613,537
[45] Date of Patent: Mar. 25, 1997

[54] STUMP CUTTING APPARATUS

[76] Inventor: Cecil D. Gassiott, 9312 Highway 165 S., Woodworth, La. 71485

[21] Appl. No.: 553,071

[22] Filed: Nov. 3, 1995

[51] Int. Cl.⁶ .................................................. B27C 9/00
[52] U.S. Cl. .................... 144/24.12; 144/334; 144/218; 144/241; 144/34.1; 241/101.72; 241/101.74; 241/292.1; 37/302
[58] Field of Search ................................ 144/24.12, 34.1, 144/218, 241, 334; 241/101.71, 101.72, 101.74, 101.75, 292.1

[56] References Cited

U.S. PATENT DOCUMENTS

| | | |
|---|---|---|
| 3,667,515 | 6/1972 | Corey . |
| 3,719,116 | 3/1973 | Burton ..................... 83/483 |
| 4,041,996 | 8/1977 | Grover . |
| 4,180,047 | 12/1979 | Bertelson ................... 125/14 |
| 4,180,107 | 12/1979 | Grover . |
| 4,271,879 | 6/1981 | Shivers . |
| 4,355,670 | 10/1982 | Ohrberg et al. ............ 144/334 |
| 5,158,126 | 10/1992 | Lang . |

Primary Examiner—W. Donald Bray
Attorney, Agent, or Firm—John M. Harrison

[57] ABSTRACT

A stump cutting apparatus which may be mounted on a watercraft such as a barge and includes a rotating cutting drum having multiple cutter blades and driven by at least one hydraulic motor mounted on a boom extending from the barge. In a preferred embodiment the boom is connected to a linkage arm and the rotating drum is rotatably mounted on a pair of cooperating mount plates fixedly spaced by a spacer plate and pivotally attached to the boom and linkage arm to facilitate adjustment of the rotating drum upwardly or downwardly with respect to the extending end of the boom, while maintaining the cutting drum and spacer plate in horizontally parallel relationship. A pair of arm hydraulic cylinders have their cylinder ends attached to mount brackets provided on the respective mount plates and the cylinder pistons connected to a stabilizing arm pivotally attached to the mount plates for stabilizing the cutter blade against a stump or tree during the cutting operation. The stabilizing arm is fitted with a blade for engaging the stump or tree as the cutter blades begin to cut the wood and the blade and stabilizing arm pivot rearwardly against hydraulic pressure in the arm hydraulic cylinders as the cutter blades cut into the stump or tree, thereby stabilizing the rotating cutting drum during the cutting operation.

14 Claims, 3 Drawing Sheets

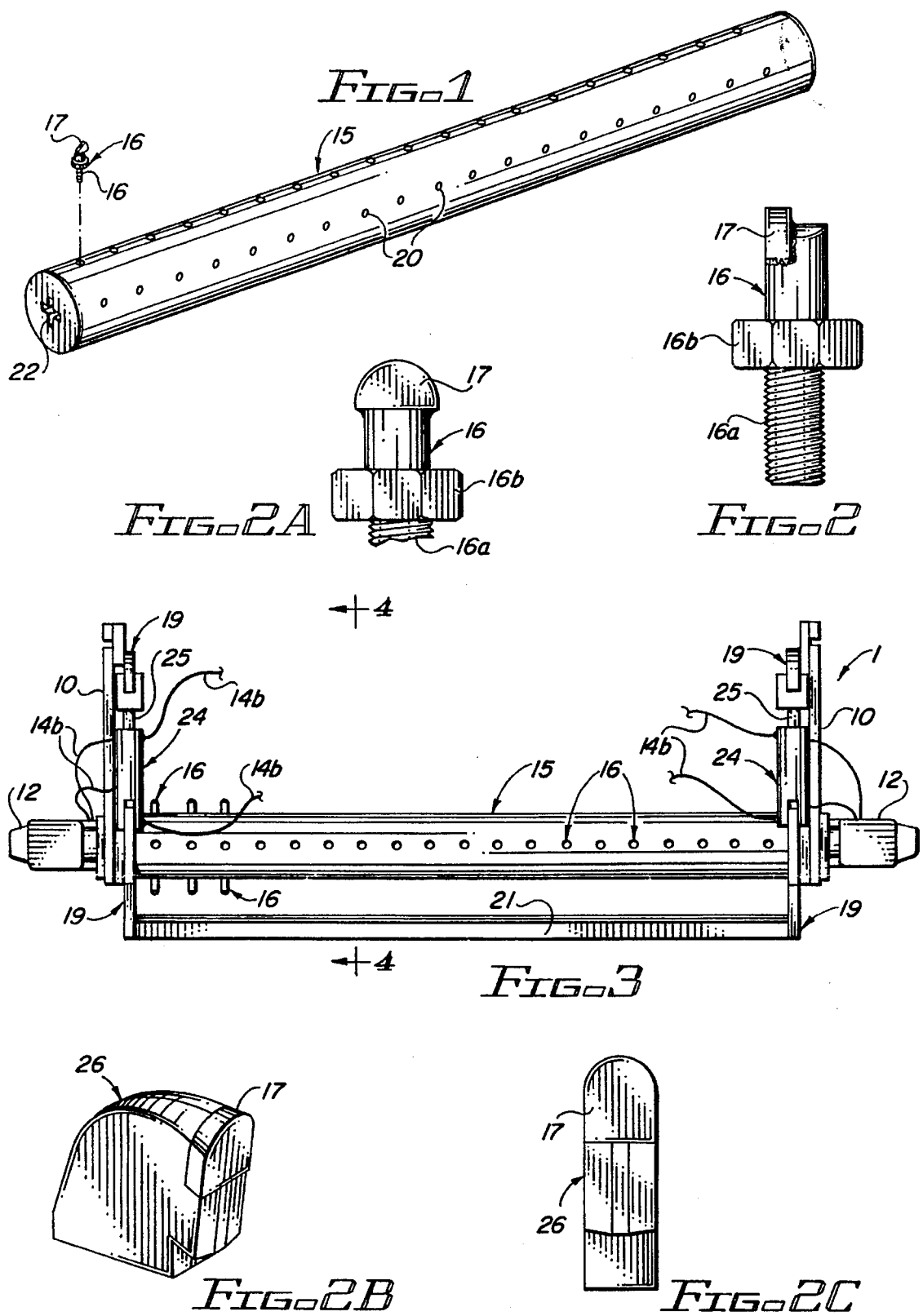

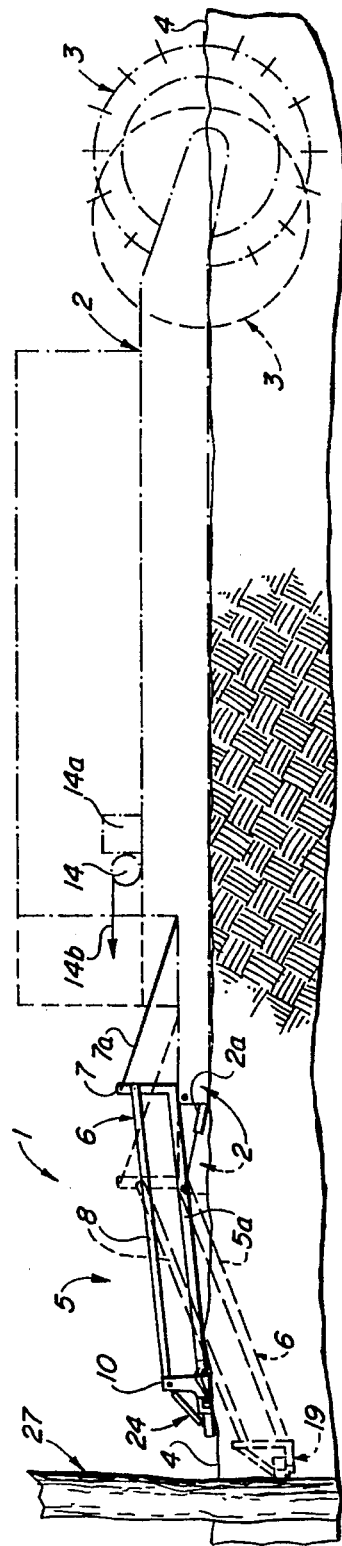
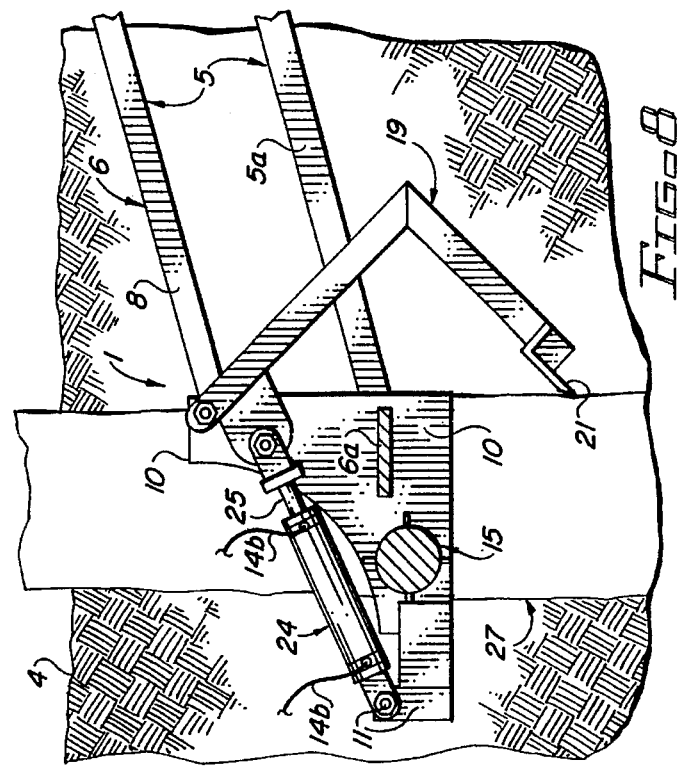
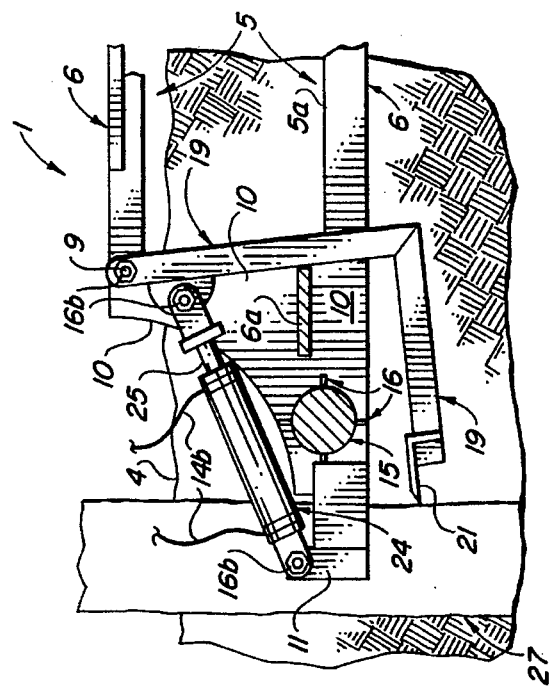

STUMP CUTTING APPARATUS

BACKGROUND OF THE INVENTION

1. Field of the Invention

This invention relates to devices for removing stumps and trees and more particularly, to a stump cutting apparatus for removing stumps and trees from a water body. The stump cutting apparatus includes a watercraft such as a barge-mounted boom connected to a pair of hydraulic barge cylinders and having a boom linkage for raising and lowering the extending end of the boom. A cylindrical rotating cutting blade is mounted on a pair of mount plates attached to the boom linkage along with a spacer plate, for fixing the spacer plates in spaced parallel orientation, such that the boom linkage is operable to maintain the cutting blade and spacer bar in horizontal, parallel relationship regardless of the depth of the cutting blade and spacer bar in the water. A stabilizing arm is pivotally attached to the mount plates and includes a stabilizing blade designed to engage a tree or stump to be cut as the cutting blade begins the cutting operation. The stabilizing arm is secured to the pistons of a pair of arm hydraulic cylinders, the cylinder ends of which are attached to the respective mount plates and the arm hydraulic cylinders facilitate pivoting of the stabilizing arm blade and stabilizing arm toward the barge as the stabilizing arm blade maintains contact with the stump or tree being cut while the rotating cutting blade cuts through the stump or tree. The boom linkage includes a pair of boom arms extending from the barge in pivoting relationship and a pair of linkage arms projecting in parallel, substantially horizontal relationship with respect to the boom arms to facilitate automatic alignment of the cutting drum and spacer plate as the boom is lowered to the desired depth for cutting of a tree or stump.

One of the problems realized in removing stumps and trees from water bodies is that of designing an apparatus which will quickly, easily, conveniently and reliably cut the stumps and trees well below the waterline in an economical manner. The drive system must be waterproof, the cutting system designed to cut through heavy cypress, oak and other stumps and trees of varying diameter and the barge or other watercraft to which the cutting system is mounted must be designed to facilitate sufficient cutting pressure for positioning with respect to the stump or tree to be cut to allow efficient cutting.

2. Description of the Prior Art

Various apparatus are known in the art for cutting trees and stumps. A "Stump Eradicator" is detailed in U.S. Pat. No. 4,041,996, dated Aug. 16, 1977, to Ross D. Grover o The apparatus includes a rotary cylinder or drum having knives or cutters around its periphery. The cutters are mounted on rings which encircle the drum and the rings have circumferentially-spaced mounting surfaces which are staggered relative to one another so that the cutters, when secured to the mounting surfaces, are themselves staggered for more effective cutting action. The drum is supported by two rotary hydraulic and/or electric motors having aligned output shafts which are connected to the ends of the drum to support and rotate it. The motors are carried by the arms of a yoke and instead of two motors, there may be a motor at one end of the drum and a bearing at the other. U.S. Pat. No. 5,158,126, dated Oct. 27, 1992, to William J. Lang, details "Improvements in Tree Stump Grinders and Methods of Grinding Tree Stumps". The tree stump grinder is adapted to be attached to a backhoe or an excavator with a boom and a stick and includes a yoke which is pivotally secured to the stick. A hydraulic grinder swing cylinder is provided to pivot the yoke relative to the stick and fixed stub shafts are secured to the arms of the yoke. Circular end plates are attached to the respective hubs and one hub is rotatably journalled on one stub shaft and the other hub is similarly mounted on the other stub shaft. A hydraulic motor is fixed to one stub shaft and drives the other hub and a grinder drum is attached to the circular end plates and encloses the hydraulic motor. Oil is supplied to the hydraulic motor through passages in one of the stub shafts and multiple block and bit assemblies are attached to the outside surface of the grinder drum. An anchor assembly is also pivotally attached to the stick and a hydraulic anchor cylinder is connected to the stick and the anchor assembly for pivoting the anchor assembly relative to the stick. Hydraulic fluid is supplied to rotate the grinder drum and position the anchor assembly and the yoke. Another stump eradicator is detailed in U.S. Pat. No. 4,180,107, dated Dec. 25, 1979, to Ross D. Grover. The apparatus includes a rotary cylinder or drum having knives or teeth around its periphery. The teeth include both cutter teeth and chipper teeth and the primary purpose of the chipper teeth is to "hog out" and remove the fibrous wood material. The primary purpose of the cutter teeth is to break up, cut or slit the fibers so that they may be more easily "hogged out" by the chipper teeth. U.S. Pat. No. 3,667,515, dated Jun. 6, 1972, to Robert J. Corey, details a "Pile Cutting Device". The device includes a base having a guide adapted for reception of a pile, the base being adapted for reciprocal movement with respect to the pile. Connectors attached to the base for suspending the base in a substantially horizontal plane are also included, along with a blade having a pair of opposite extremities, one of the extremities being pivotally mounted to the base. An actuator having a fixed member and a movable member is also provided, the fixed member being pivoted to the base and the movable member pivotally mounted to the other extremity of the blade, also swept across the guide when the actuator is engaged and retracted away from the guide when the actuator is disengaged. When the pile cutter is lowered to the base of a pile, the guide is positioned about the pile for restricting the lateral movement of the base with respect to the pile and the actuator is engaged, causing the blade to shear the pile at its base. U.S. Pat. No. 3,719,116, dated Mar. 6, 1973, to Cyril Burton, et al, details an "Underwater Saw For Tree and Stump Removal". The underwater component is connected to a surface vessel by means of a flexible connection which includes an anchor cable, hydraulic lines, control lines, television and light connections. The device includes hydraulically-operated propellers for controlling the attitude and position of the cutter assembly, a television camera and light source for viewing the underwater scene from the surface vessel and a pair of saw blades rotating in a horizontal plane by hydraulic motors to cut trees and stumps under the water. U.S. Pat. No. 4,180,047, dated Dec. 25, 1979, to George H. Bertelson, details an "Above and Below Water and Land Pile Cutting Apparatus and Method". The device includes a main frame which is quadrangular in transverse cross-section and is shaped to receive the pile to be cut. The upper portion of the main frame carries an extensible, pile-gripping clamp apparatus and the center portion carries four circular saws, each mounted on a carriage fitted for transverse reciprocation. The lower portion of the frame carries an additional pile-gripping, extensible clamping apparatus. U.S. Pat. No. 4,271,879, dated Jun. 9, 1981, to Norman E. Shivers, Jr. et al, details a "Hydraulic Stump Cutting and Digging Apparatus". The device includes a balanced main supporting frame of a vehicle member and an adjustable telescopic channel frame cutter boom, the boom including a forward, centrally-disposed, rotatable cutting wheel having multiple, radially-extending cutting teeth circumferentially mounted thereon. The channel frame cutter boom further includes a hydraulic motor contiguously mounted with the cutting wheel and having a common axis for rotation. A double pump and motor for circulation of hydraulic fluid to the hydraulic components of the apparatus is mounted on the main supporting frame, thus providing a telescopic cutter boom which is lighter in weight and more accessible to tighter places than conventional hydraulic stump cutters. In one embodiment the adjustable, telescopic channel frame cutter boom is provided with flexible side flaps which permit the removal of tree stumps situated close to permanent obstructions, yet provides a protective means for controlling cut material through the channel frame of the boom.

It is an object of this invention to provide a new and improved stump cutting apparatus which may be mounted on a land vehicle or watercraft such as a barge and configured to cut submerged stumps and trees at a selected depth.

Another object of this invention is to provide a barge-mounted stump cutting apparatus which includes rotating cutting drum pivotally mounted on one end of a boom linkage apparatus for automatically orienting the cutting assembly in proper cutting position, which boom linkage apparatus is hydraulically pivoted with respect to the barge to submerge the cutting assembly.

Another object of the invention is to provide a new and improved, barge-mounted stump cutting apparatus which includes a rotating cutting drum attached to one end of a boom linkage apparatus pivotally attached to the barge, with a hydraulically-operated stabilizing arm pivotally attached to the cutting assembly frame for engaging a submerged stump or tree and stabilizing the cutting drum as the cutting drum cuts the stump or tree beneath the surface of the water at a selected depth.

A still further object of this invention is to provide a new and improved stump cutting apparatus which is mounted on a barge by means of a hydraulically-actuated boom and boom linkage, and includes a cutting assembly fitted with a rotating cutting drum having fixed or removable drum teeth thereon, a hydraulically-actuated stabilizing arm pivotally secured to the cutting assembly frame and having a blade for engaging the stump or tree at a selected depth determined by the boom position and stabilizing the stump or tree while the cutting drum cuts through the stump or tree at the selected depth.

SUMMARY OF THE INVENTION

These and other objects of the invention are provided in a new and improved, barge-mounted stump cutting apparatus which is characterized by a cutting assembly mounted on one end of a pivoting boom having a hydraulic boom attitude-control apparatus and a boom linkage for automatically positioning the cutting assembly in alignment with a submerged segment of a tree or stump. A rotating cutting blade is provided in the cutting assembly for cutting the tree or stump, the rotating cutting blade stabilized in contact with the tree or stump by means of a stabilizing arm having a stabilizing blade engaging the tree or stump, which stabilizing arm is pivotally attached to the boom linkage by means of arm hydraulic cylinders to facilitate smoothly cutting the tree or stump at the selected depth by means of the rotating cutting blade as the cutting blade is stabilized by the stabilizer blade.

BRIEF DESCRIPTION OF THE DRAWING

The invention will be better understood by reference to the accompanying drawings, wherein:

FIG. 1 is a perspective view of a cutting drum element;

FIG. 2 is a side elevation of a typical drum tooth for threading into the cutting drum illustrated in FIG. 1;

FIG. 2A is a front elevation, partially in section, of the drum tooth illustrated in FIG. 2;

FIG. 2B is a perspective view of an alternative drum tooth for welding on the cutting drum element;

FIG. 2C is a front view of the drum tooth illustrated in FIG. 2B;

FIG. 3 is a front view of the cutting drum assembled for cutting a tree or stump;

FIG. 4 is a sectional view taken along line 4—4 of the assembled cutting drum illustrated in FIG. 3;

FIG. 6 is a side view of the assembled cutting drum and associated boom, mounted for operation on a barge;

FIG. 8 is a side view, partially in section, of the assembled cutting drum cutting through a stump.

DETAILED DESCRIPTION OF THE PREFERRED EMBODIMENTS

Figure 5:
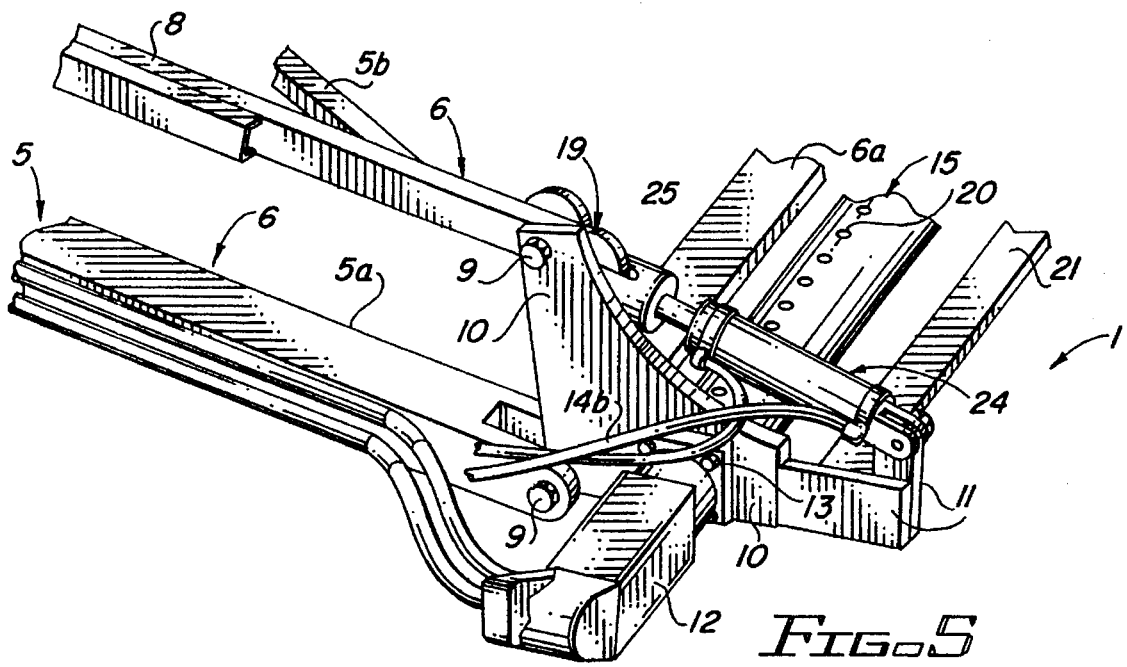
FIG. 5 is a perspective view, partially in section, of the assembled cutting drum illustrated in FIGS. 3 and 4.
Figure 7:
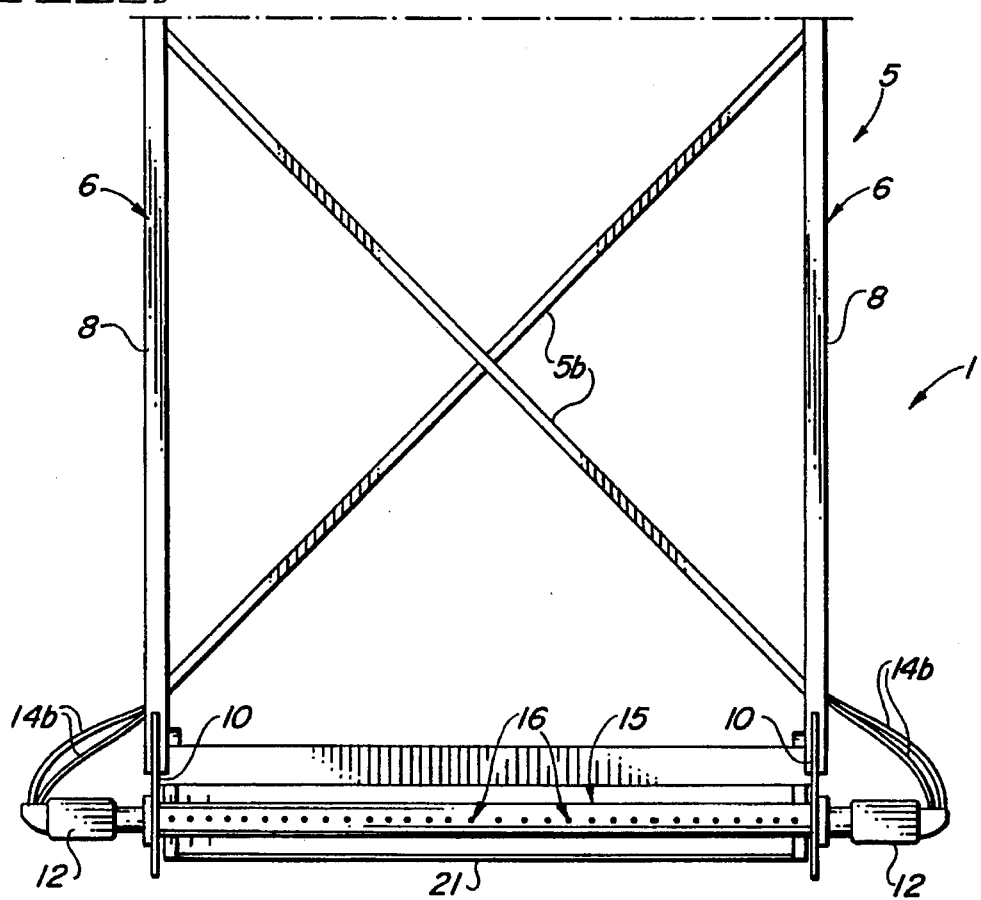
FIG. 7 is a top view of the assembled cutting drum and boom with arm hydraulic cylinders omitted for clarity.

Referring initially to FIGS. 1–4 and 6 of the drawings the stump cutting apparatus of this invention is generally illustrated by reference numeral 1 and is mounted on a barge 2, floating on a water body 4 and fitted with paddle wheels 3 for locomotion. The stump cutting apparatus 1 is characterized by a boom 5, having a pair of parallel boom arms 5a, common ends of which are pivotally attached to the barge 2 by means of boom pins 18 and are engaged by a pair of barge cylinders 2a, as illustrated in FIG. 6. The boom arms 5a are stabilized in the parallel extending configuration by means of cross-braces 5b and a pair of linkage arms 8 project from mount arms 7, fixedly mounted on the barge 2, and stabilized by the mount arm rods 7a, such that the linkage arms 8 and the boom arms 5a define primary components in a boom linkage 6, as hereinafter further described. The opposite common ends of the boom arm 5 and the linkage arms 8 are connected to opposite ends of a pair of mount plates 10 by means of linkage bolts 9, such that the mount plates 10 are pivotally disposed in the boom linkage 6, as hereinafter further described. A spacer plate 6a is welded or otherwise fixed to the mount plates 10 to space the mount plates 10 with respect to each other. A cylinder mount bracket 11 projects from each of the mount plates 10 and a cutting drum 15 is rotatably disposed between the mount plates 10. A pair of hydraulic motors 12 are bolted to the mount plates 10 by means of motor mount bolts 13 and engage a splined opening 22, provided in the cutting drum 15, to facilitate rotatable operation of the cutting drum 15 responsive to hydraulic fluid pumped through the hydraulic motors 12 by means of the hydraulic fluid lines 14b, from a hydraulic fluid reservoir 14a and a hydraulic pump 14. Multiple drum teeth 16 are provided on the cutting drum 15, and in a first embodiment of the invention the drum teeth 16 are fitted with carbide tips 17 to enhance the efficiency of the cutting drum 15 during the cutting operation. In this embodiment the drum teeth 16 are provided with tooth threads 16a that engage corresponding drum threads 20, tapped in the cylindrical cutting drum 15 and seated by the nuts 16b, as illustrated in FIGS. 1–2A. Alternatively, the welded drum teeth 26, illustrated in FIGS. 2B and 2C, can be welded to the cutting drum 15 and may also have carbide tips 17 to enhance the cutting action.

Referring now to FIGS. 4 and 8 of the drawings a stabilizing arm 19 is pivotally attached to the top end of the mount plates 10 by means of the linkage bolts 9 and the cylinder end of an arm cylinder 24 is pivotally mounted on the respective cylinder mount brackets 11 on the mount plates 10, while the cylinder pistons 25 of each of the arm cylinders 24 are pivotally attached to the respective stabilizing arms 19. The generally L-shaped stabilizing arms 19 project a stabilizing arm blade 21 element of the stabilizing arm 19 beneath, parallel to, and slightly forward of the cutting drum 15, as illustrated in FIG. 4. Accordingly, it will be appreciated from a consideration of FIG. 8 that the stabilizing arm 19 and stabilizing arm blade 21 are able to move rearwardly beneath the cutting drum 15 by extension of the respective cylinder pistons 25 from the corresponding arm cylinders 24.

In operation, and referring again to FIGS. 4, 6 and 8 of the drawing it will be appreciated that the barge 2 can be driven by the paddle wheels 3 into position with respect to a tree or stump 27 to be cut, such that the cutting drum 15 is positioned transverse to the stump 27 and the arm cylinders 24 can be operated to retract or extend the cylinder pistons 25 and manipulate the stabilizing arm blade 21 of the stabilizing arm 19 slightly forward of the cutting drum 15 for initial engagement with the stump 27. The barge cylinders 2a are then operated to pivot the boom 5 on the boom pivot pins 18 and submerge the extending end of the boom 5 and the cutting drum 15 to a desired depth at which the stump is to be cut. As the cutting drum 15 is submerged, the boom linkage 6 operates to pivot the mount plates 10 on the boom arm 5a and the linkage arm 8 and maintain the spacer plate 6a, disposed between the mount plates 10 and located behind and parallel the cutting drum 15 in a substantially horizontal position rearwardly of the cutting drum 15. This relative position of the cutting drum 15 and the spacer plate 6a is maintained regardless of the cutting depth, since the boom arms 5a and linkage arms 8 are disposed in parallel relationship with respect to each other, are connected at the ends and are of the same length, thus automatically pivoting the mount plates 10 and maintaining the spacer plate 6a in approximately horizontal configuration regardless of the depth to which the boom 5 is submerged. When the cutting drum 15 is submerged to the proper cutting depth, the paddle wheels 3 are operated to force the stabilizing arm blade 21 on the stabilizing arm 19 into the submerged stump 27 and further pressure applied by the paddle wheels 3 causes the stabilizing arm blade 21 and stabilizing arm 19 to pivot rearwardly against the hydraulic pressure applied through an adjustable relief valve (not illustrated) in the arm cylinders 24, as illustrated in FIG. 8. This hydraulic action facilitates continued engagement of the stabilizing arm blade 21 with the stump 27 as the drum teeth 16 or welded drum teeth 26 on the cutting drum 15 bite into the stump 27 and begin the cutting operation. Accordingly, the stabilizing arm blade 21 maintains contact with the stump 27 immediately below the point of cut as the paddle wheels 3 continually force the drum teeth 16 or welded drum teeth 26 into the stump 27 and thus facilitates even, stabilized cutting of the cutting drum 15 through the stump 27 without "climbing" of the cutting drum 15 on the stump 27. Horizontal cutting of the stump 27 by means of the cutting drum 15 thus facilitates extension of the horizontally-oriented spacer plate 6a into the cut made by the drum teeth 16, while the stabilizing arm blade 21 maintains contact with the stump 27 as the cylinder pistons 25 of the arm cylinders 24 extend from the arm cylinders 24 under a selected degree of hydraulic pressure generated by the hydraulic pump 14 and the adjustable relief valve (not illustrated), through the hydraulic fluid lines 14b. The engagement of the stabilizing arm blade 21 consistently with the stump 27 below the cut made by the cutting drum 15 stabilizes the cutting drum 15 and prevents "chattering", "wandering" and "climbing" of the cutter drum 15 with respect to the stump 27 during the cutting operation. When cutting large stumps, the stabilizing arm blade 21 will pivot rearwardly until it falls into the cut, and at this time, the horizontal spacer plate 6a engages the upper portion of the stump being cut, to prevent "climbing" of the cutting drum 15.

It will be appreciated by those skilled in the art that although a pair of hydraulic motors 12 are preferred in the stump cutting apparatus 1, a single hydraulic motor 12 can be utilized on one of the mount plates 10 and a bearing provided in the opposite mount plate 10 for assemblying the stump cutting apparatus 1. Furthermore, various hydraulic controls and accessories, including the adjustable relief valve, which are well known to those skilled in the art, may be coupled to the hydraulic fluid pump 14 and hydraulic fluid reservoir 14a for operation of the hydraulic motors 12, arm hydraulic cylinders 24 and barge cylinders 2a. It will be further appreciated that the stump cutting apparatus 1 may be mounted on a land vehicle rather than a barge 2, as desired, for cutting trees and stumps under dry conditions.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A stump cutting apparatus comprising a pair of mount plates disposed in spaced, fixed relationship with respect to each other; a spacer plate fixedly attached to said mount plates for maintaining said mount plates in said spaced, fixed relationship; a cylindrical cutting drum journalled for rotation on said mount plates and a plurality of cutting element means provided on said cutting drum for cutting the stump; at least one motor mounted on at least one of said mount plates, said motor having a motor shaft operably connected to said cutting drum on the axis of rotation of said cutting drum for rotating said cutting drum; and a stabilizing arm pivotally carried by said mount plates for engaging the stump; a stabilizing blade provided on said stabilizing arm, said stabilizing blade positioned substantially parallel to said cutting drum and below said cutting drum between said cutting drum and the stump; and a pair of hydraulic cylinders pivotally attached to said mount plates, respectively, said hydraulic cylinders having pistons pivotally connected to said stabilizing arm, whereby said stabilizing blade engages the stump and stabilizes said cutting drum responsive to operation of said hydraulic cylinders as said cutting drum cuts the stump.

2. The stump cutting apparatus of claim 1 comprising a plurality of threaded sockets provided in said cutting drum and wherein said cutting element means each comprises a threaded cutting tooth for threadably engaging said threaded sockets in said cutting drum and a carbide tip provided on said cutting tooth for cutting the stump.

3. The stump cutting apparatus of claim 1 wherein said at least one motor comprises a pair of hydraulic motors mounted on said mount plates, respectively, for powering said cutting drum.

4. The stump cutting apparatus of claim 3 wherein said cutting element means each comprises a cutting tooth for welding to said cutting drum and a carbride tip provide on said cutting tooth for cutting the stump.

5. A stump cutting apparatus for mounting on a watercraft, said stump cutting apparatus comprising boom means pivotally carried by the watercraft; a pair of mount plates mounted on said boom means in spaced relationship with respect to each other; a spacer plate horizontally fixedly attached to said mount plates for maintaining said mount plates in said spaced relationship; a cylindrical cutting drum journalled for rotation on said mount plates and substantially horizontally aligned with said spacer plate; a plurality of cutting element means provided on said cutting drum for cutting the stump; at least one motor mounted on at least one of said mount plates, said motor having a motor shaft operably connected to said cutting drum on the axis of rotation of said cutting drum for rotating said cutting drum; and stabilizing blade means pivotally carried by said mount plates for engaging the stump and stabilizing said cutting drum when said cutting drum is cutting the stump.

6. The stump cutting apparatus of claim 5 wherein said boom means comprises a pair of boom arms, each having one end pivotally attached to the watercraft in spaced relationship with respect to each other and the opposite ends of said boom arms extending from the watercraft; a pair of hydraulic watercraft cylinders attached to the watercraft, said hydraulic watercraft cylinders having pistons pivotally attached to said one end of said boom arms for selectively raising and lowering said opposite ends of said boom arms; a pair of linkage arms disposed substantially parallel to said boom arms, respectively, with one end of each of said linkage arms connected to said one end of said boom arms and the opposite ends of said linkage arm and said boom arms pivotally attached to said mount plates, respectively, whereby said cutting drum and said spacer plates remain substantially horizontally aligned with respect to each other responsive to pivoting of said mount plates in concert as said opposite ends of said boom arms and said linkage arms and said cutting drum are submerged in the water body responsive to operation of said hydraulic watercraft cylinders.

7. The stump cutting apparatus of claim 6 wherein said stabilizing blade means comprises a stabilizing arm pivotally carried by said mount plates; a stabilizing blade provided on said stabilizing arm, said stabilizing blade positioned substantially parallel to said cutting drum and below said cutting drum between said cutting drum and the stump; and a pair of arm hydraulic cylinders pivotally attached to said mount plates, respectively, said arm hydraulic cylinders having pistons pivotally connected to said stabilizing arm, whereby said stabilizing blade engages the stump and stabilizes said cutting drum responsive to operation of said arm hydraulic cylinders as said cutting drum cuts the stump.

8. The stump cutting apparatus of claim 6 comprising a plurality of threaded sockets provided in said cutting drum and wherein said cutting element means each comprises a threaded cutting tooth for threadably engaging said threaded sockets in said cutting drum and a carbide tip provided on said cutting tooth for cutting the stump.

9. The stump cutting apparatus of claim 6 comprising a plurality of threaded sockets provided in said cutting drum and wherein:

(a) said stabilizing blade means comprises a stabilizing arm pivotally carried by said mount plates; a stabilizing blade provided on said stabilizing arm, said stabilizing blade positioned substantially parallel to said cutting drum and below said cutting drum between said cutting drum and the stump; and a pair of arm hydraulic cylinders pivotally attached to said mount plates, respectively, said arm hydraulic cylinders having pistons pivotally connected to said stabilizing arm, whereby said stabilizing blade engages the stump and stabilizes said cutting drum responsive to operation of said hydraulic cylinders as said cutting drum cuts the stump; and (b) said cutting element means each comprise a threaded cutting tooth for threadably engaging said cutting drum and a carbide tip provided on said cutting tooth for cutting the stump.

10. The stump cutting apparatus of claim 9 wherein said at least one motor comprises a pair of hydraulic motors mounted on said mount plates, respectively, for powering said cutting drum.

11. A stump cutting apparatus for mounting on a barge and cutting a stump underwater, said stump cutting apparatus comprising a pair of boom arms, each having one end pivotally attached to the barge in spaced relationship with respect to each other and the opposite ends of said boom arms extending from the watercraft; a pair of hydraulic watercraft cylinders pivotally attached to the watercraft, said hydraulic watercraft cylinders having pistons pivotally attached to said one end of said boom arms, respectively, for selectively raising and lowering said opposite ends of said boom arms; a pair of mount plates pivotally connected to said opposite ends of said boom arms, respectively, and a spacer plate fixedly spacing said mount plates; a cutting drum journalled for rotation between said mount plates in substantially horizontal, parallel alignment with said spacer plate; stabilizing blade means pivotally carried by said mount plates for engaging the stump, pivoting on said mount plates and stabilizing said cutting drum when said cutting drum is cutting the stump; a pair of linkage arms disposed substantially parallel to said boom arms, respectively, with one end of said linkage arms attached to said one end of said boom arms, respectively, and the opposite ends of said linkage arms pivotally attached to said mount plates, whereby said cutting drum and said spacer plate remain in said substantially horizontal, parallel alignment with respect to each other responsive to pivoting of said mount plates in concert as said opposite ends of said boom arms and said linkage arms and said cutting drum are submerged in the water body by operation of said hydraulic watercraft cylinders.

12. The stump cutting apparatus of claim 11 wherein said stabilizing blade means comprises a stabilizing arm pivotally carried by said mount plates; a stabilizing blade provided on said stabilizing arm, said stabilizing blade positioned substantially parallel to said cutting drum and below said cutting drum between said cutting drum and the stump; and a pair of arm hydraulic cylinders pivotally attached to said mount plates, respectively, said arm hydraulic cylinders having pistons pivotally connected to said stabilizing arm, whereby said stabilizing blade engages the stump and stabilizes said cutting drum responsive to operation of said arm hydraulic cylinders as said cutting drum cuts the stump.

13. The stump cutting apparatus of claim 11 wherein said cutting element means each comprises a cutting tooth for welding to said cutting drum and a carbide tip provided on said cutting tooth for cutting the stump.

14. The stump cutting apparatus of claim 11 wherein said cutting element means each comprises a base for welding to said cutting drum and a carbide tip provided on said cutting tooth for cutting the stump and said stabilizing blade means comprises a stabilizing arm pivotally carried by said mount plates; a stabilizing blade provided on said stabilizing arm, said stabilizing blade positioned substantially parallel to said cutting drum and below said cutting drum, between said cutting drum and the stump; and a pair of arm hydraulic cylinders pivotally attached to said mount plates, respectively, said arm hydraulic cylinders having pistons pivotally connected to said stabilizing arm, whereby said stabilizing blade engages the stump and stabilizes said cutting drum responsive to operation of said arm hydraulic cylinders as said cutting drum cuts the stump.

* * * * *